(12) United States Patent
Suzuki et al.

(10) Patent No.: US 11,710,880 B2
(45) Date of Patent: Jul. 25, 2023

(54) TERMINAL FOR SECONDARY BATTERY AND SECONDARY BATTERY PROVIDED WITH THE TERMINAL

(71) Applicant: PRIME PLANET ENERGY & SOLUTIONS, INC., Tokyo (JP)

(72) Inventors: Kosuke Suzuki, Toyota (JP); Takahiro Sakurai, Nagoya (JP)

(73) Assignee: Prime Planet Energy & Solutions, Inc., Tokyo (JP)

( * ) Notice: Subject to any disclaimer, the term of this patent is extended or adjusted under 35 U.S.C. 154(b) by 0 days.

(21) Appl. No.: 17/409,990

(22) Filed: Aug. 24, 2021

(65) Prior Publication Data

US 2022/0085467 A1 Mar. 17, 2022

(30) Foreign Application Priority Data

Sep. 17, 2020 (JP) .................................. 2020-155914

(51) Int. Cl.
*H01M 50/562* (2021.01)

(52) U.S. Cl.
CPC .................................. *H01M 50/562* (2021.01)

(58) Field of Classification Search
CPC ............. H01M 50/562; H01M 50/553; H01M 50/564; H01M 50/543; H01M 50/552; H01M 10/0525; H01M 50/55; H01M 50/188; Y02E 60/10
See application file for complete search history.

(56) References Cited

U.S. PATENT DOCUMENTS

| | | |
|---|---|---|
| 2011/0052970 A1 | 3/2011 | Kurata et al. |
| 2013/0196192 A1 | 8/2013 | Harada et al. |
| 2015/0086844 A1 | 3/2015 | Masuda |
| 2015/0183052 A1 | 7/2015 | Murakami et al. |
| 2015/0243955 A1 | 8/2015 | Kang |
| 2015/0318519 A1 | 11/2015 | Tsutsumi et al. |
| 2016/0043353 A1 | 2/2016 | Tsutsumi et al. |
| 2017/0229700 A1 | 8/2017 | Matsumoto et al. |

(Continued)

FOREIGN PATENT DOCUMENTS

| | | |
|---|---|---|
| CN | 106575741 A | 4/2017 |
| CN | 111183536 A | 5/2020 |

(Continued)

*Primary Examiner* — Ula C Ruddock
*Assistant Examiner* — Sarika Gupta
(74) *Attorney, Agent, or Firm* — Finnegan, Henderson, Farabow, Garrett & Dunner, LLP

(57) ABSTRACT

A secondary battery terminal is provided which is constituted by dissimilar metals and which has a structure capable of preventing liquid from penetrating into a boundary between the dissimilar metals of the terminal. The terminal disclosed herein includes a plate-like metallic first member and a second member which is metallically joined to one plate surface of the first member and which is constituted by a metal that differs from a metal constituting the first member. A first stepped portion constituted by an end of the second member, which is more protruded than the one plate surface of the first member, is formed at a boundary between the plate surface and the metallically-joined second member and, further, a second stepped portion which protrudes from the one plate surface of the first member is formed on the plate surface.

2 Claims, 3 Drawing Sheets

(56) References Cited

U.S. PATENT DOCUMENTS

| | | |
|---|---|---|
| 2018/0331348 A1 | 11/2018 | Kobayashi |
| 2019/0044107 A1* | 2/2019 | Ito .................. H01M 50/531 |
| 2019/0273240 A1 | 9/2019 | Hagino et al. |
| 2020/0243868 A1 | 7/2020 | Takabayashi et al. |
| 2020/0358071 A1 | 11/2020 | Kawanishi |

FOREIGN PATENT DOCUMENTS

| | | |
|---|---|---|
| EP | 3 062 370 A1 | 8/2016 |
| EP | 3 467 906 A1 | 4/2019 |
| JP | 07-224944 A | 8/1995 |
| JP | 11-283588 A | 10/1999 |
| JP | 2004-220963 A | 8/2004 |
| JP | 2005-019213 A | 1/2005 |
| JP | 2009-087728 A | 4/2009 |
| JP | 2009-110808 A | 5/2009 |
| JP | 2011-124024 A | 6/2011 |
| JP | 2013-075297 A | 4/2013 |
| JP | 2013-157156 A | 8/2013 |
| JP | 2015-059826 A | 3/2015 |
| JP | 2015-088464 A | 5/2015 |
| JP | 2015-162460 A | 9/2015 |
| JP | 2016-018675 A | 2/2016 |
| JP | 2016-058215 A | 4/2016 |
| JP | 2016-132131 A | 7/2016 |
| JP | 2016-207510 A | 12/2016 |
| JP | 2017-027819 A | 2/2017 |
| JP | 6087413 B1 | 3/2017 |
| JP | 6216368 B2 | 10/2017 |
| JP | 2020-107473 A | 7/2020 |
| JP | 2020-119874 A | 8/2020 |
| WO | WO 2014/103874 A1 | 7/2014 |
| WO | WO 2015/060175 A1 | 4/2015 |
| WO | WO 2017/141694 A1 | 8/2017 |

\* cited by examiner

TERMINAL FOR SECONDARY BATTERY AND SECONDARY BATTERY PROVIDED WITH THE TERMINAL

CROSS-REFERENCE TO RELATED APPLICATIONS

The present application claims priority on the basis of Japanese Patent Application No. 2020-155914 filed in Japan on Sep. 17, 2020, the entire contents of which are incorporated herein by reference.

BACKGROUND OF THE DISCLOSURE

1. Technical Field

The present disclosure relates to a terminal of a secondary battery. Specifically, the present disclosure relates to a terminal which is arranged at a prescribed position in a secondary battery and which enables conduction from inside to outside of the secondary battery, and to a secondary battery using the terminal.

2. Background

Secondary batteries such as lithium-ion secondary batteries are capable of producing high energy density despite being lightweight and are therefore widely used as portable power supplies of personal computers, portable terminals, and the like as well as vehicle-mounted power supplies of EVs (electrical vehicles), HVs (hybrid vehicles), PHVs (plug-in hybrid vehicles), and the like.

A secondary battery is provided with a gasket in order to prevent an electrolyte solution stored inside the battery from leaking from a predetermined space. Japanese Patent Application Publication No. H11-283588 discloses an internal gasket in which protruded portions are formed on both surfaces thereof in order to more effectively prevent leakage of an electrolyte solution. One to three protruded portions are formed on each surface and, by compressing the protruded portions, penetration of the electrolyte solution is suppressed.

SUMMARY

Meanwhile, in order to realize a preferable joint between electrode terminals (a positive electrode terminal and a negative electrode terminal) provided in a secondary battery and an external member such as a busbar, an electrode terminal constructed by joining dissimilar metals to each other has been proposed. Constructing the electrode terminals using dissimilar metals enables metals that constitute the external member, an external member joining portion of the positive electrode terminal, and an external member joining portion of the negative electrode terminal to be unified to an identical metal and enables preferable joints to be realized between the external member and the electrode terminals.

However, when an electrode terminal is constituted by dissimilar metals, since ionization tendencies differ among different metallic species, penetration of a liquid into a boundary surface between dissimilar metals that constitute the electrode terminal results in generation of electricity between the dissimilar metals and may cause corrosive deterioration of the metals. Therefore, in a secondary battery provided with an electrode terminal constituted by dissimilar metals, penetration by a liquid into a boundary surface between the dissimilar metals has to be prevented.

The present disclosure has been made in consideration of the situation described above and a main object thereof is to provide a secondary battery terminal which is constituted by dissimilar metals and which has a structure that enables penetration by a liquid into a boundary surface between the dissimilar metals to be prevented. In addition, another object of the present disclosure is to provide a secondary battery provided with the terminal.

The terminal disclosed herein is a terminal constituting any of positive and negative electrodes of a secondary battery and includes a plate-like metallic first member and a second member which is metallically joined to one plate surface of the first member and which is constituted by a metal that differs from a metal constituting the first member. A first stepped portion constituted by an end of the second member, which is more protruded than the one plate surface of the first member, is formed at a boundary between the plate surface and the metallically-joined second member and, further, a second stepped portion which protrudes from the one plate surface of the first member is formed on the plate surface.

According to such a configuration, since pressure on a gasket that is arranged between a battery case and a terminal increases at the first stepped portion and the second stepped portion, a terminal capable of preventing a liquid from penetrating into a boundary between the first member and the second member can be provided.

In addition, in a preferable aspect of the terminal disclosed herein, the first member is constituted by aluminum or an alloy having aluminum as a main component, and the second member is constituted by copper or an alloy having copper as a main component.

According to such a configuration, a terminal is provided which enables joining between an external member such as a busbar that is constituted by aluminum or an alloy having aluminum as a main component and the first member and joining between a negative electrode internal terminal which is constituted by copper or an alloy having copper as a main component and which is electrically connected to a negative electrode and the second member to be preferably performed and which enables penetration by a liquid into a boundary between dissimilar metals to be preferably prevented.

Furthermore, a secondary battery disclosed herein includes: an electrode body including a positive electrode and a negative electrode; a battery case housing therein the electrode body; a positive electrode terminal and a negative electrode terminal electrically connected to the positive electrode and the negative electrode of the electrode body, respectively; and a gasket arranged between the battery case and the positive electrode terminal and between the battery case and the negative electrode terminal. At least one of the positive electrode terminal and the negative electrode terminal includes a terminal structured as disclosed herein, the first member of the terminal is arranged outside the battery case, the second member of the terminal is arranged so as to extend from the outside of the battery case to inside of the battery case, and the gasket is pressed by both the first stepped portion and the second stepped portion outside the battery case.

According to such a configuration, a highly reliable secondary battery is provided which enables both penetration by an electrolyte solution from inside the battery case and penetration by a liquid from outside the battery case into a boundary between dissimilar metals of a terminal to be prevented.

DETAILED DESCRIPTION

Figure 1:
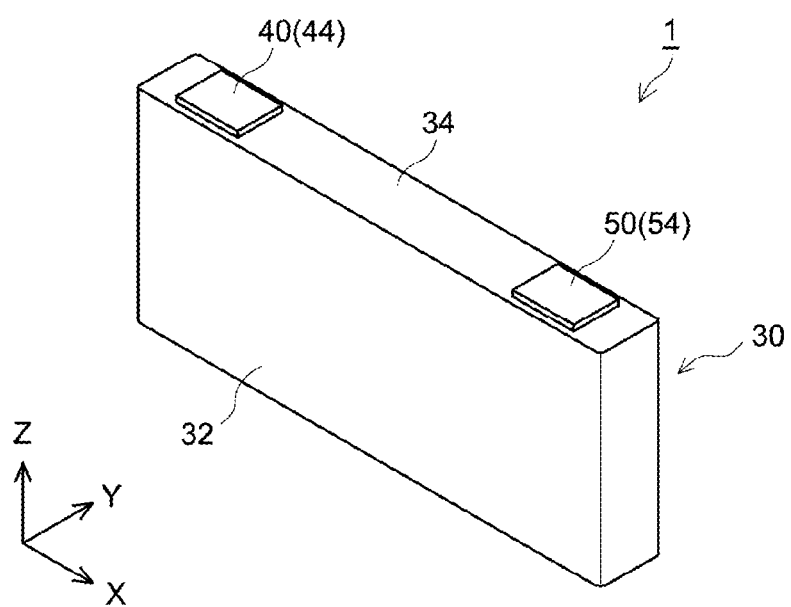
FIG. 1 is a perspective view schematically showing a secondary battery according to an embodiment.

Hereinafter, an outline of configuration examples of a secondary battery provided with a terminal according to the present embodiment will be described with reference to the drawings. It should be noted that, in the following drawings, members and portions that produce the same effects will be described using the same reference characters. It should also be noted that dimensional relationships (a length, a width, a thickness, and the like) shown in the respective drawings do not reflect actual dimensional relationships. Matters required to carry out the present disclosure, with the exception of matters specifically mentioned in the present specification, may be understood to be design matters of a person with ordinary skill in the art based on the prior art in the relevant technical field.

In the drawings of the present specification, a reference character X denotes a width direction (of a battery), a reference character Y denotes a thickness direction, and a reference character Z denotes a height direction. However, it should be noted that such directions are directions determined for the sake of illustration and are not intended to limit modes of installation of batteries.

In the present specification, a "secondary battery" refers to repetitively chargeable/dischargable power storage devices in general and encompasses so-called storage batteries (in other words, chemical batteries) such as a lithium-ion secondary battery, a nickel hydride battery, and a nickel-cadmium battery as well as capacitors (in other words, physical batteries) such as an electrical double layer capacitor. In addition, in the present specification, a "lithium-ion secondary battery" refers to a secondary battery using lithium ions as charge carriers in which charging and discharging are realized by the movement of charges accompanying lithium ions between a positive electrode and a negative electrode.

Figure 2:
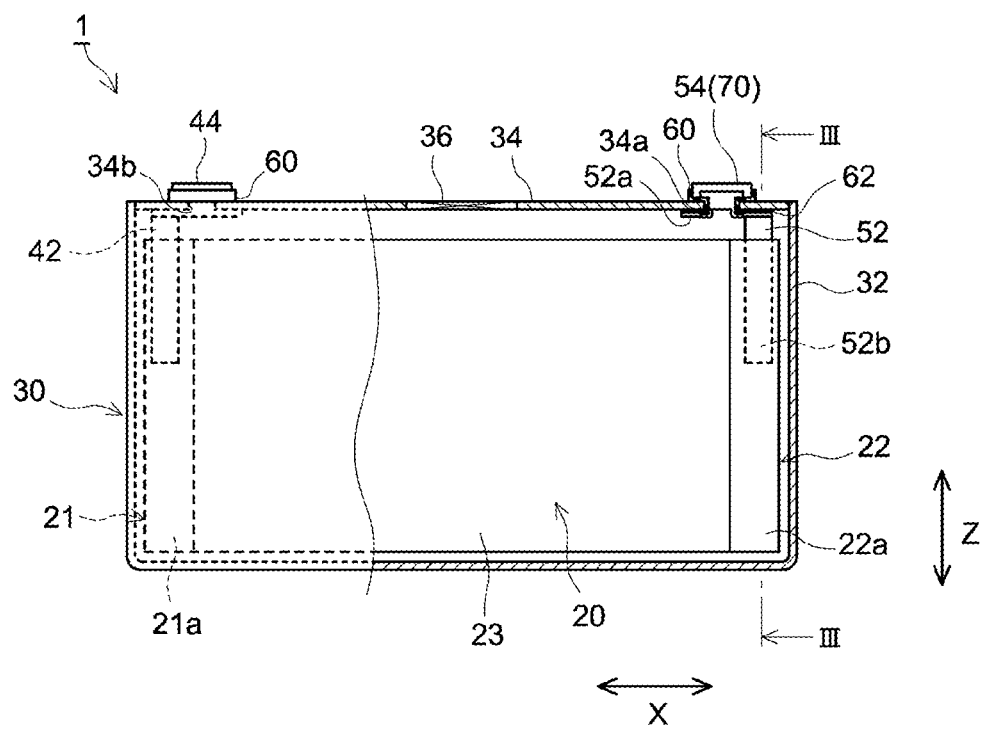
FIG. 2 is a partial breakaway view schematically showing a secondary battery according to an embodiment.

FIG. 1 is a perspective view schematically showing a secondary battery according to the present embodiment. In addition, FIG. 2 is a partial breakaway view schematically showing the secondary battery according to the embodiment. A secondary battery 1 according to the present embodiment includes an electrode body 20, an electrolyte (not illustrated), a battery case 30, a positive electrode terminal 40, a negative electrode terminal 50, a gasket 60, and an insulator 62. Each of these is explained hereinafter.

Battery Case

The battery case 30 is a container which houses the electrode body 20. As shown in FIG. 1, the battery case 30 according to the present embodiment is a flat square container. However, the shape of the battery case 30 may be a box shape that is not a square (for example, a bottomed cylindrical box shape). The battery case 30 includes a square case main body 32 of which an upper surface is opened and a plate-shaped lid 34 which closes an opening portion of the case main body 32. In addition, as shown in FIG. 2, the lid 34 is provided with a safety valve 36 that releases internal pressure inside the battery case 30 when the internal pressure rises to or exceeds a prescribed level. In addition, the lid 34 is provided with a terminal insertion hole 34a that enables the negative electrode external terminal 54 to be inserted and a terminal insertion hole 34b that enables the positive electrode external terminal 44 to be inserted. As a material of the battery case 30, a metallic material with required strength is used and, for example, a lightweight metallic material with good thermal conductivity such as aluminum, stainless steel, or nickel-plated steel is used.

Electrode Body

The electrode body 20 is a power generation element housed inside the battery case 30 in a state of being covered by an insulating film (not illustrated) or the like. The electrode body 20 according to the present embodiment includes an elongated sheet-shaped positive electrode 21, an elongated sheet-shaped negative electrode 22, and an elongated sheet-shaped separator 23. The electrode body 20 is a wound electrode body in which the elongated sheet-shaped members described above are wound in layers. It should be noted that the structure of the electrode body is not particularly limited and various structures that may be adopted in a general sealed battery can be adopted. For example, the electrode body may be a laminated electrode body in which a positive electrode and a negative electrode with rectangular sheet shapes are laminated via a separator.

The positive electrode 21 includes a foil-shaped positive electrode current collector (for example, aluminum foil) and a positive electrode active material layer formed on a surface (preferably, both surfaces) of the positive electrode current collector. In addition, in one side edge portion (a left-side side edge portion in FIG. 2) of the positive electrode 21 in a width direction X, the positive electrode active material layer is not formed but a positive electrode connecting portion 21a is formed in which the positive electrode current collector is exposed. The positive electrode active material layer includes various materials such as a positive electrode active material, a binder, and a conductive material. Regarding the materials included in the positive electrode active material layer, materials that may be used in a conventional general secondary battery (for example, a lithium-ion secondary battery) can be used without any particular limitations, and since the materials included in the positive electrode active material layer do not limit the present disclosure, a detailed description thereof will be omitted.

The negative electrode 22 includes a foil-shaped negative electrode current collector (for example, copper foil) and a negative electrode active material layer formed on a surface (preferably, both surfaces) of the negative electrode current collector. In addition, in another side edge portion (a right-side side edge portion in FIG. 2) of the negative electrode 22 in the width direction X, the negative electrode active material layer is not formed but a negative electrode connecting portion 22a is formed in which the negative electrode current collector is exposed. In a similar manner to the positive electrode active material layer, the negative electrode active material layer also includes various materials such as a negative electrode active material, a binder, and the like. Regarding the materials included in the negative electrode active material layer, materials that may be used in a conventional general secondary battery can be similarly used without any particular limitations, and since the materials included in the negative electrode active material layer do not limit the present disclosure, a detailed description thereof will be omitted.

The separator 23 is interposed between the positive electrode 21 and the negative electrode 22 and prevents the electrodes from coming into direct contact with each other. Although not illustrated, micropores are formed in plurality in the separator 23, and a configuration is adopted in which lithium ions move between the positive electrode 21 and the negative electrode 22 through these micropores. While a resin sheet or the like having required heat resistance is used as the separator 23 since a separator that may be used in a conventional general secondary battery can be used as the separator 23 without any particular limitations, a detailed description thereof will be omitted.

As an electrolyte (not illustrated) housed in the battery case 30, electrolytes that may be used in a conventional general secondary battery can be used without any particular limitations and, for example, while the electrolyte may be a nonaqueous liquid electrolyte (a nonaqueous electrolytic solution) containing a nonaqueous solvent and a supporting salt, since the electrolyte does not limit the present disclosure, a detailed description thereof will be omitted.

Electrode Terminal

Figure 3:
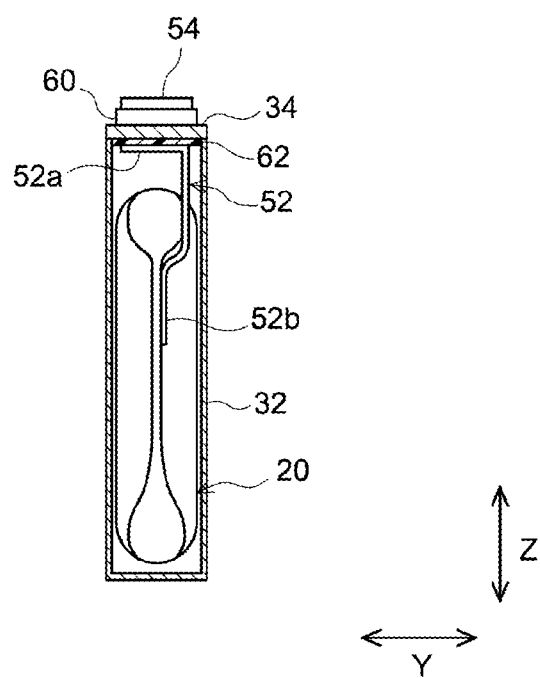
FIG. 3 is a cross-sectional view taken along line III-III of FIG. 2.

The negative electrode terminal 50 includes a negative electrode-side current collector terminal (the negative electrode internal terminal 52) and a negative electrode-side external connection terminal (the negative electrode external terminal 54). The negative electrode internal terminal 52 is an elongated metal member that extends in the height direction Z. As shown in FIGS. 2 and 3, a lower end 52b of the negative electrode internal terminal 52 is joined and electrically connected to the negative electrode 22 (specifically, the negative electrode connecting portion 22a) inside the battery case 30. It should be noted that, in FIG. 2, a terminal 70 disclosed herein is provided as the negative electrode external terminal 54. The negative electrode external terminal 54 is inserted into the terminal insertion hole 34a provided on the lid 34, a part of the negative electrode external terminal 54 is exposed outside of the battery case 30, and another part of the negative electrode external terminal 54 is electrically connected inside the battery case 30 to an upper end 52a of the negative electrode internal terminal 52. A through-hole for inserting the negative electrode external terminal 54 is provided in the upper end 52a of the negative electrode internal terminal 52 and, by causing a swaging portion provided on the negative electrode external terminal 54 to protrude from the through-hole and then swaging the swaging portion, an electrical connection between the negative electrode internal terminal 52 and the negative electrode external terminal 54 is realized. The insulator 62 is arranged between the lid 34 and the negative electrode internal terminal 52 in order to prevent conduction between the battery case 30 (the lid 34) and the negative electrode internal terminal 52 and the negative electrode external terminal 54 and, further, the gasket 60 is arranged between the lid 34 and the negative electrode external terminal 54.

The positive electrode terminal 40 has a structure that is approximately the same as that of the negative electrode terminal 50 described above. In other words, the positive electrode terminal 40 includes a positive electrode-side current collector terminal (the positive electrode internal terminal 42) and a positive electrode-side external connection terminal (the positive electrode external terminal 44). The positive electrode internal terminal 42 is an elongated metal member that extends in the height direction Z. A lower end of the positive electrode internal terminal 42 is joined and electrically connected inside the battery case 30 to the positive electrode 21 (specifically, the positive electrode connecting portion 21a). In addition, the positive electrode external terminal 44 is inserted into the terminal insertion hole 34b provided on the lid 34, a part of the positive electrode external terminal 44 is exposed outside of the battery case 30, and another part of the positive electrode external terminal 44 is connected inside the battery case 30 to an upper end of the positive electrode internal terminal 42. A through-hole for inserting the positive electrode external terminal 44 is provided in the upper end and, by causing a swaging portion provided on the positive electrode external terminal 44 to protrude from the through-hole and then swaging the swaging portion, an electrical connection between the positive electrode internal terminal 42 and the positive electrode external terminal 44 is realized. In addition, in the positive electrode terminal 40 according to the present embodiment, the insulator 62 is arranged between the lid 34 and the positive electrode internal terminal 42 in order to prevent conduction between the battery case 30 (the lid 34) and the positive electrode internal terminal 42 and the positive electrode external terminal 44 and, further, the gasket 60 is arranged between the lid 34 and the positive electrode external terminal 44.

Gasket

Figure 5:
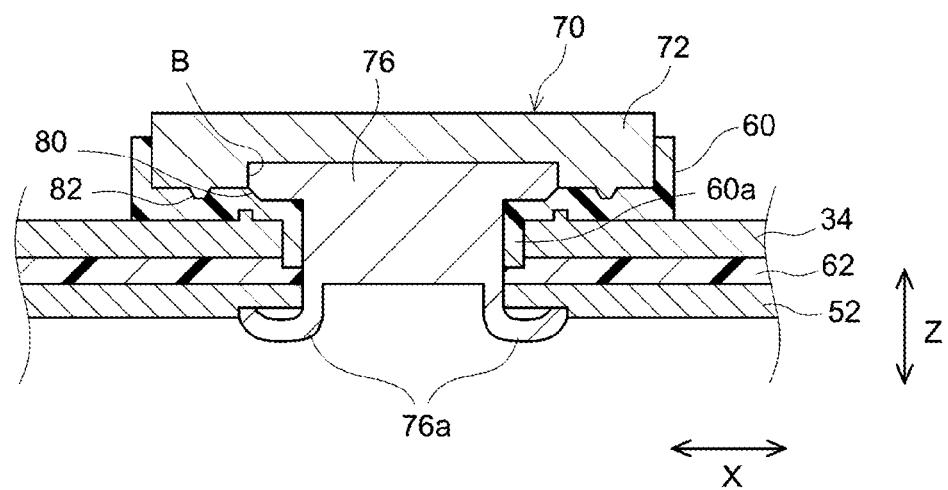
FIG. 5 is a sectional view schematically showing a connecting portion of a terminal in a secondary battery according to an embodiment.

The gasket 60 is arranged between the lid 34 and the positive electrode external terminal 44 and between the lid 34 and the negative electrode external terminal 54 outside the battery case 30 and in the terminal insertion holes 34a and 34b provided on the lid 34. Accordingly, the gasket 60 insulates the lid 34 from the positive electrode external terminal 44 and the negative electrode external terminal 54. The gasket 60 has a through-hole into which the external terminals are to be inserted. In addition, as shown in FIG. 5, the gasket 60 has a hollow cylindrical portion 60a provided along a peripheral edge of the through-hole and a part of the external terminals is inserted into the cylindrical portion 60a. Accordingly, inner circumferential surfaces of the terminal insertion holes 34a and 34b provided on the lid 34 and the external terminals are prevented from coming into direct contact with each other. In addition, due to the swaging portion of the positive electrode external terminal 44 or the negative electrode external terminal 54 being swaged, the gasket 60 is compressed in the height direction Z between an outer surface of the lid 34 and the positive electrode external terminal 44 or the negative electrode external terminal 54. Accordingly, a space between the outer surface of the lid 34 and the positive electrode external terminal 44 or the negative electrode external terminal 54 can be sealed and leakage of a liquid or the like from inside the battery case 30 can be prevented and, at the same time, penetration of liquid, e.g., water or the like, from outside the battery case 30 can be prevented.

The gasket 60 is formed of an insulative material capable of elastic deformation and, for example, a fluorine-based resin such as perfluoroalkoxy alkane resin (PFA), polyphenylene sulfide resin (PPS), aliphatic polyamide, or the like is used.

Insulator

The insulator 62 is arranged between the lid 34 and the positive electrode internal terminal 42 and between the lid 34 and the negative electrode internal terminal 52 inside the battery case 30 and insulates the lid 34 and the internal terminals from each other. The insulator 62 has a through-hole into which the positive electrode external terminal 44 or the negative electrode external terminal 54 is to be inserted, and a part of the external terminal is inserted into the through-hole. Due to the swaging portion of the positive electrode external terminal 44 or the negative electrode external terminal 54 being swaged, the insulator 62 is compressed in the height direction Z between the outer surface of the lid 34 and the positive electrode external terminal 44 or the negative electrode external terminal 54 to be fixed.

The insulator 62 is formed of an insulative material and, for example, a resin material such as polyphenylene sulfide resin (PPS) is used.

Terminal

Figure 4:
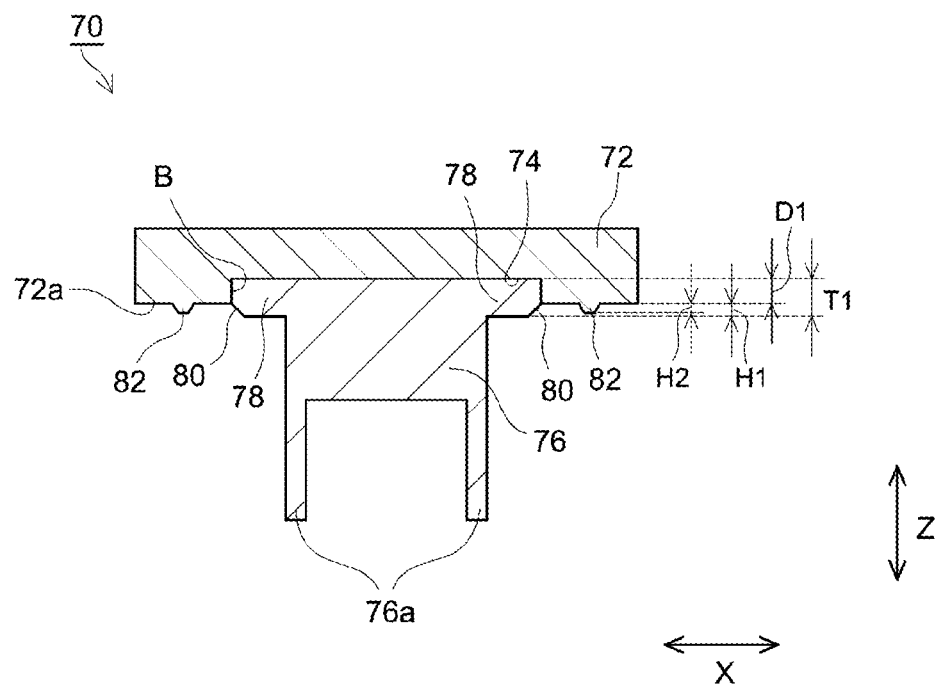
FIG. 4 is a sectional view schematically showing a structure of a terminal according to an embodiment.

In the secondary battery 1 according to the present embodiment, the terminal 70 structured as disclosed herein is adopted as at least one of the positive electrode external terminal 44 and the negative electrode external terminal 54. As shown in FIG. 4, the terminal 70 is provided with a first member 72, a second member 76, and a first stepped portion 80 and a second stepped portion 82. In addition, the first member 72 and the second member 76 are constituted by different metals, and a boundary B of dissimilar metals is present between the first member 72 and the second member 76.

When the terminal 70 is provided in the secondary battery 1, as shown in FIGS. 2 and 5, the first member 72 is arranged outside of the battery case 30 and the second member 76 is arranged so as to extend from the outside of the battery case 30 (or the terminal insertion hole of the lid 34) to inside the battery case 30. In the present embodiment, the terminal 70 is provided as the negative electrode external terminal 54. Specifically, arrangement is made such that, by inserting the second member 76 that constitutes the terminal 70 into the cylindrical portion 60a of the gasket 60, the terminal insertion hole 34a of the lid 34, the through-hole of the insulator 62, and the through-hole at the upper end 52a of the negative electrode internal terminal 52 in this order and causing the swaging portion 76a provided on the second member 76 to protrude from the through-hole of the upper end 52a of the negative electrode internal terminal 52, and subsequently swaging the swaging portion 76a so that a compressive force is applied in the height direction Z, the gasket 60, the lid 34, the insulator 62, and the negative electrode internal terminal 52 are pressure-bonded to each other. In addition, in the portions where the first stepped portion 80 and the second stepped portion 82 are formed, the gasket 60 can be more strongly pressed and pressure-bonded.

The first member 72 is formed in a plate shape. In addition, one plate surface 72a of the first member 72 is metallically joined to the second member 76. A method of performing the metallic joining is not particularly limited and the metallic joining may be performed by ultrasonic welding, diffusion joining, friction pressure welding, laser welding, or the like.

As shown in FIG. 4, a recessed portion 74 to which the second member 76 is to be fitted may be formed on the one plate surface 72a of the first member 72. By fitting the recessed portion 74 and a part of the second member 76 with each other, the first member 72 and the second member 76 may be more strongly joined to each other.

The first stepped portion 80 is formed by an end of the second member 76 that protrudes more than the one plate surface 72a of the first member 72 at the boundary B between the one plate surface 72a of the first member 72 and the metallically-joined second member 76. Therefore, as shown in FIG. 5 when the terminal 70 is installed in the secondary battery 1 (in other words, when the swaging portion 76a is swaged so that a compressive force is applied in the height direction Z), the gasket 60 is more strongly pressed in the height direction Z (in other words, a thickness direction of the gasket 60) in the first stepped portion 80. Accordingly, an electrolyte solution can be prevented from penetrating into the boundary B of the dissimilar metals of the terminal 70 from inside the battery case 30.

A flange portion 78 may be provided in a part of the second member 76 in order to form the first stepped portion 80. The flange portion 78 is shaped so as to spread outward from a shaft portion of the second member 76. By metallically joining the second member 76 provided with the flange portion 78 to the one plate surface 72a of the first member 72, the first stepped portion 80 may be formed at an end of the flange portion 78. In addition, as shown in FIG. 4, when the recessed portion 74 is formed on the first member 72, the flange portion 78 may be formed such that a thickness T1 of the flange portion 78 is greater than a depth D1 of the recessed portion 74. Accordingly, by performing metallic joining in a state where a part of the second member 76 including the flange portion 78 is fitted to the recessed portion 74, the first stepped portion 80 constituted by the plate surface 72a and the end of the flange portion 78 is formed. A height H1 of the first stepped portion 80 at this point is a difference between T1 and D1 described above.

The second stepped portion 82 is formed on the plate surface 72a of the first member 72 so as to protrude from the plate surface on an outer peripheral side of the boundary B of the dissimilar metals. Accordingly, as shown in FIG. 5, when the terminal 70 is installed in the secondary battery 1 (in other words, when the swaging portion 76a is swaged so that a compressive force is applied in the height direction Z), the gasket 60 is more strongly pressed in the height direction Z (in other words, the thickness direction of the gasket 60) in the second stepped portion 82. As a result, a liquid such as water can be prevented from penetrating into the boundary B of the dissimilar metals from outside the battery case 30.

A difference between the height H1 of the first stepped portion 80 and a height H2 of the second stepped portion 82 is preferably as small as possible and, for example, H1 is preferably within a range of 0.8 times to 1.2 times H2. More preferably, H1 is formed within a range of 0.9 times to 1.1 times H2 and, even more preferably, H1 is formed within a range of 0.95 times to 1.05 times H2. Since the smaller the difference between the height H1 and the height H2, the stronger the gasket 60 can be pressed in both the first stepped portion 80 and the second stepped portion 82, a liquid can be prevented from penetrating into the boundary B of the dissimilar metals of the terminal 70 in a more reliable manner.

In the terminal 70 disclosed herein, the first member 72 and the second member 76 are constituted by metals that differ from each other. Accordingly, since the first member 72 and an external member such as a bulbar to be joined to the first member 72 can be constituted by similar metals, weldability can be improved. Furthermore, since the second member 76 and an internal terminal to be joined to the second member 76 can be constituted by similar metals, a preferable connection can be realized.

Preferably, the first member 72 is constituted by aluminum or an alloy having aluminum as a main component and the second member 76 is constituted by copper or an alloy having copper as a main component. Using the terminal 70 manufactured with the members described above as the negative electrode external terminal 54 enables conduction on a negative electrode side to be improved and enables weldability with a busbar made of aluminum to be improved.

It should be noted that, in the present specification, "an alloy of which aluminum is a main component" refers to an alloy of which at least 70% is made of aluminum. While other constituent elements contained in the alloy are not particularly limited, the alloy may include silicon, iron, copper, manganese, magnesium, zinc, chromium, titanium, lead, or zirconium.

In addition, in the present specification, "an alloy of which copper is a main component" refers to an alloy of which at least 50% is made of copper. While other constituent elements contained in the alloy are not particularly limited, the alloy may include silicon, iron, manganese, magnesium, zinc, chromium, titanium, lead, tin, phosphorus, aluminum, nickel, cobalt, beryllium, or zirconium.

While specific examples of the present disclosure have been described in detail, such specific examples are merely illustrative and are not intended to limit the scope of claims. It is to be understood that a technique described in the claims encompasses various alterations and modifications of the specific examples described above.

What is claimed is:

1. A secondary battery, comprising:
   an electrode body including a positive electrode and a negative electrode;
   a battery case housing therein the electrode body, the battery case including a case main body and a lid which closes an opening portion of the case main body;
   a positive electrode terminal and a negative electrode terminal electrically connected to the positive electrode and negative electrode of the electrode body, respectively; and
   a gasket arranged between the battery case and the positive electrode terminal and between the battery case and the negative electrode terminal, wherein
   at least one of the positive electrode terminal and the negative electrode terminal includes:
     a plate-like metallic first member which includes a recessed portion formed on a plate surface of the first member which opposes an outer surface of the lid, and
     a second member including a flange portion provided in a part of the second member which is metallically joined to the plate surface of the first member in a state where a part of the second member including the flange portion is fitted to the recessed portion and which is constituted by a metal that differs from a metal constituting the first member,
   a thickness of the flange portion is greater than a depth of the recessed portion,
   a first stepped portion constituted by the plate surface of the first member and the end of the flange portion is formed at a boundary between the plate surface of the first member and the metallically-joined second member,
   a second stepped portion which protrudes from the plate surface of the first member toward the outer surface of the lid is formed on the plate surface of the first member,
   the first member of the terminal is arranged outside the battery case,
   the second member of the terminal is arranged so as to extend from the outside of the battery case to inside of the battery case, and
   the gasket is pressed by both the first stepped portion and the second stepped portion outside the battery case.

2. The secondary battery according to claim 1, wherein the first member is constituted by aluminum or an alloy having aluminum as a main component, and the second member is constituted by copper or an alloy having copper as a main component.

* * * * *